Aug. 22, 1944.  C. B. OGILVIE ET AL  2,356,266
MACHINE CONTROL MEANS
Filed Oct. 28, 1942  3 Sheets-Sheet 1

INVENTORS
CHARLES B. OGILVIE
WESLEY E. NICKELL
LUSTER E. COLLEY
BY
ATTORNEYS

Aug. 22, 1944. C. B. OGILVIE ET AL 2,356,266
MACHINE CONTROL MEANS
Filed Oct. 28, 1942 3 Sheets-Sheet 2
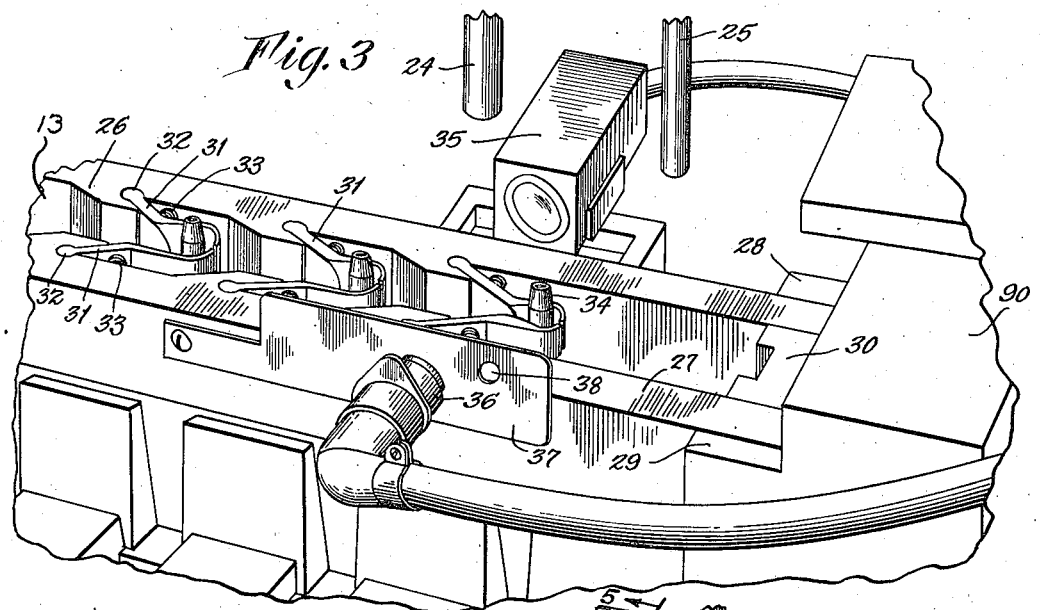
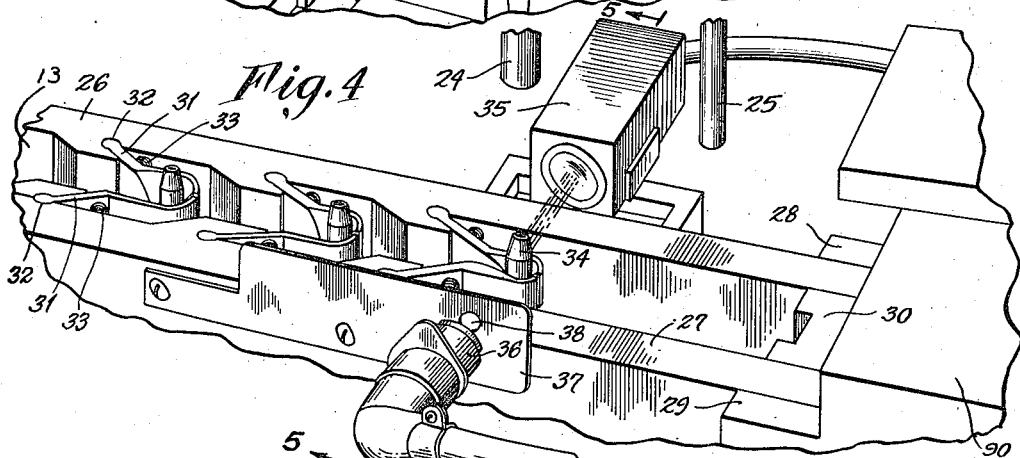
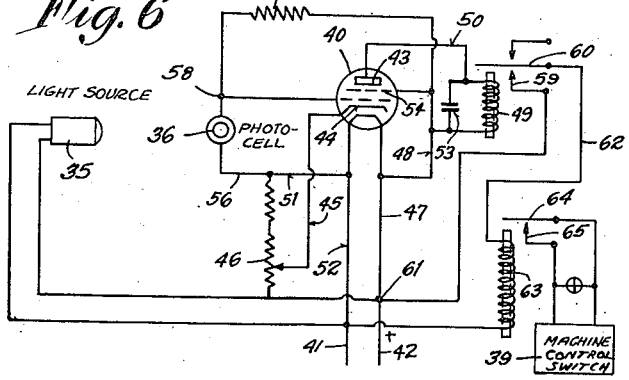
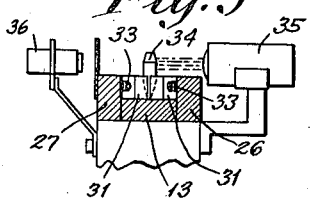
INVENTORS
CHARLES B. OGILVIE
WESLEY E. NICKELL
LUSTER E. COLLEY
BY
ATTORNEYS Aug. 22, 1944.  C. B. OGILVIE ET AL  2,356,266
MACHINE CONTROL MEANS
Filed Oct. 28, 1942  3 Sheets-Sheet 3
*Fig. 7*
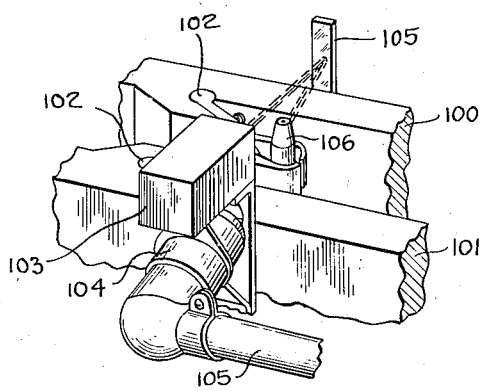
*Fig. 8*
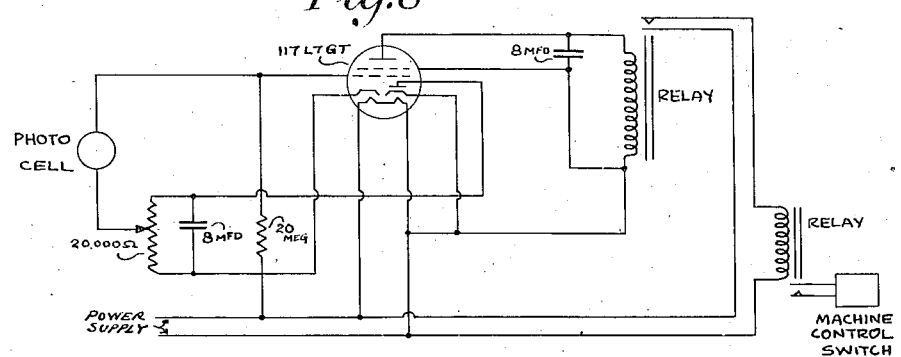
*Fig. 9*
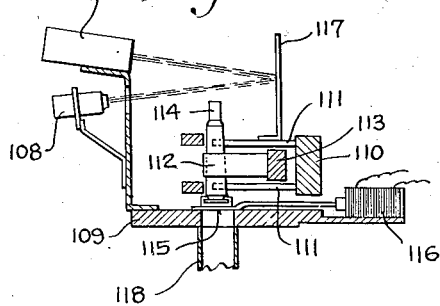
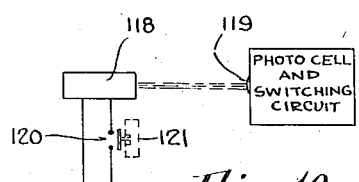
*Fig. 10*
INVENTORS
CHARLES B. OGILVIE
WESLEY E. NICKELL
LUSTER E. COLLEY
BY
Verner Smythe
ATTORNEYS Patented Aug. 22, 1944

2,356,266

UNITED STATES PATENT OFFICE 2,356,266

MACHINE CONTROL MEANS

Charles B. Ogilvie, North Kansas City, Wesley E. Nickell, Lee's Summit, and Luster E. Colley, Buckner, Mo., assignors to Remington Arms Company, Inc., Bridgeport, Conn., a corporation of Delaware Application October 28, 1942, Serial No. 463,706

9 Claims. (Cl. 86—23)

This invention relates to a stopping means for machinery, and particularly, to a light sensitive or photoelectric cell stopping system for ammunition making machines.

In the manufacture of ammunition, machines are used to assemble the various component parts and it is frequently desirable to have a safety means to stop the machine in the event a component or part thereof is absent at a particular station. The usual machine has a transfer means to move the component from station to station. The absence of a component may be caused by the component being gripped by the forming tool at a station and erroneously removed from the transfer means. Another piece may then be carried underneath the tool and when this latter occurs, the tool, upon its next reciprocation, will carry the erroneously engaged component onto a new component with resultant breakage or stoppage of the machine.

As specific examples, the present device may be applied to a bullet assembly machine or a cartridge loading machine. The other objects of the invention will appear from the following description and drawings which are to be considered as merely illustrative and not limiting.

Fig. 3 is a perspective fragmentary view of the photoelectric stopping means as applied to a bullet assembly machine.

Fig. 4 is similar to Fig. 3 with the exception that the component to be operated upon is in line with the photoelectric cell and source of light.

Fig. 5 is a cross sectional view of Fig. 4 taken at the line 5—5 of Fig. 4.

Fig. 6 is a wiring diagram which may be used.

Fig. 7 is a perspective fragmentary view of another form of the invention as applied to a bullet assembly machine.

Fig. 8 is a modification of the wiring diagram.

Fig. 9 is a fragmentary sectional view of another form of the invention as applied to a loading machine.

Fig. 10 is a diagrammatic view of another form of the invention.

Figure 1:
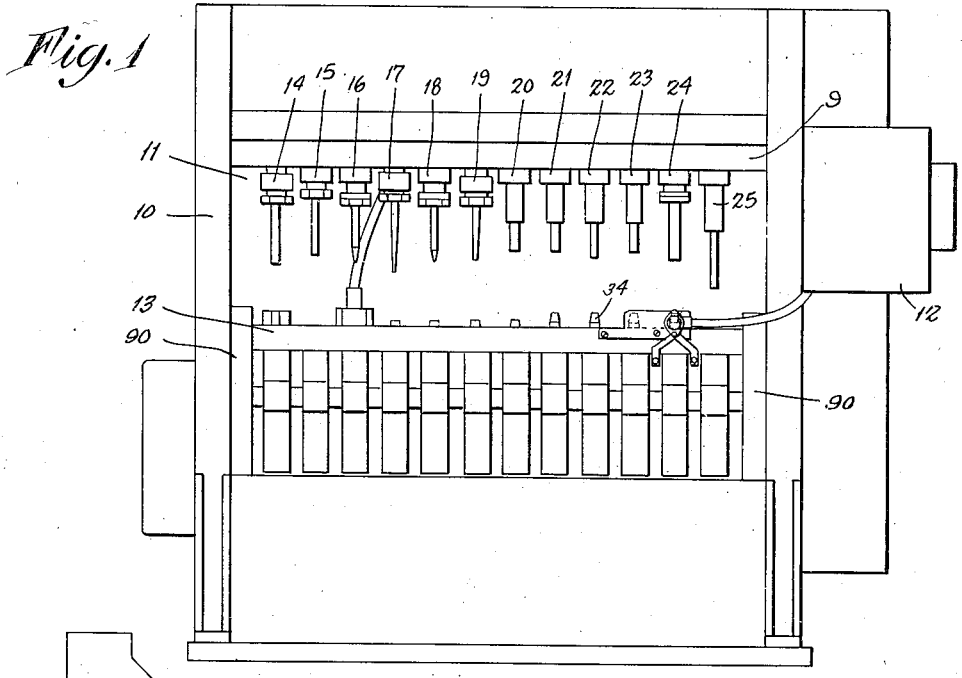
Fig. 1 shows a front diagrammatic view of a bullet assembly machine.

Referring to Fig. 1, the main frame of the machine is indicated at 10 with the various operating tools (14—25) shown generally at 11. The tools 11 may be carried by reciprocating means 9 which is operated by the drive motor 12. The transfer bar 13 is guided by guides 90 and serves to move the bullet elements from left to right under the various tool or operating stations. The transfer bar 13 is reciprocated by suitable drive connections (not shown) operated by the main drive 12. At suitable locations, plungers may be located underneath the tool stations to raise or properly position the component with respect to each one of the tools. The precise details of the tools is immaterial and not a part of the present invention. For example, the tools at stations 14—19 may serve to deliver the various components of the projectile and assemble the same. Tools at operating stations 20—23, inclusive, may be used for shaping or tapering the heel of the projectile in any well-known manner. It is to be understood that various combinations and sequences may be used and that the bullet may be assembled completely in one machine or that the operation may be completed in two machines. Most of these stations are so designed that the projectile will not be wedged in the tool and carried upwardly as the tool reciprocates. Station 24 may be known as the "correction station" which serves to complete the heel closure and to bring the projectile to correct length. There is a danger that the projectile may become lodged in the forming die at the end of 24 instead of remaining in the transfer bar for movement to the ejection station 25. If this occurs, another projectile will be carried into place under the correction punch and when the correction punch descends at the next reciprocation, a jam or breakage will occur due to the presence of the previous projectile in the correction punch.

The photoelectric cell apparatus as applied to this form of the invention serves to inspect and determine whether or not the projectile has been carried upwardly with the plunger 24 and stops the machine if this has occurred.

The transfer mechanism reciprocates in a substantially horizontal plane and comprises the channel shaped bar 13 with legs 26 and 27 shown in Fig. 3. The bar is suitably guided in bearings 90 having portions 28, 29 and 30. The specific form of the bearing or guide may be changed as desired. The transfer bars may carry suitable fingers 31 which are pivotally mounted in apertures 32 in the transfer bar 13. Springs 33 may be located behind each of the transfer fingers to allow pivotal action of the fingers as the transfer bar moves. When the tools have been reciprocated downwardly so that each engages one of the components being operated upon, the transfer bar may move to the left so that each pair of fingers grasps the next succeeding component. The springs behind the transfer fingers allow the fingers to pivot as they slide past the components which at that moment are being held as they are operated upon by their tools. After the reciprocating tools have been raised, the transfer bar moves to the right and thereby carries a component from each of the stations to the next succeeding station. In Fig. 3, the transfer bar is shown as it is moving and carrying a projectile, for example, from under the correction punch 24 to the ejection punch 25.

In Fig. 4, the component 34 is shown located underneath the correction punch 24 as the punch is descending.

In Fig. 5, the reciprocating transfer bar 13, having the arms 26 and 27, is shown with the transfer finger 31 holding the projectile 34 positioned in line with the light source 35 and photoelectric cell 36. A shield or shutter 37 is fastened to the transfer bar to reciprocate therewith. The shutter has a hole 38 which is located so as to be in line with a component held in the fingers of the transfer bar before the transfer bar starts to move after the correction punch has finished operating thereon as seen in Fig. 4. The light source may be any suitable type of light and may have a lens focusing the rays of light therefrom across the projectile and through the hole 38 to the photoelectric cell 36. The photoelectric cell may be of any suitable type such as a selenium cell or any light sensitive cell.

When a projectile is in position as shown in Fig. 4 and 5, the light from the cell 35 will be prevented from reaching the photoelectric cell 36 in sufficient quantities to operate the same. If the projectile has been carried up by the punch and therefore is not present in the fingers, the light will fall upon the cell 36 to operate the same and through suitable mechanism, which will be described, will serve to stop the machine so as to prevent damage to the punch. It will also be evident that if for some reason the projectile has failed to feed at some previous station, the machine will be stopped due to the absence of a projectile at the correction punch station.

One example of a suitable wiring diagram is shown in Fig. 6 wherein the light source is indicated at 35 with a photoelectric cell of the selenium type at 36. The machine stopping switch or relay is shown diagrammatically at 39. A vacuum tube 40 of the tetrode type may be used to serve as a relay which will operate when light falls on the photoelectric cell from the light source. It is to be understood, however, that any suitable type of electronic relay tube may be used.

The plate circuit of tube 40 may be traced from the positive power lead 42, lead 47, lead 48, relay coil 49, lead 50, plate 43, cathode 44, lead 45, voltage divider 46, lead 51, lead 52, to the negative power lead 41. The source of power 41—42 may be alternating or direct and a condenser 53 is provided around relay coil 49 to eliminate chatter when alternating current is used. A screen grid 54 may be employed and connected as indicated, if desired. The control grid 55 may be connected to one side of the photoelectric cell 36. The photoelectric cell is connected through lead 56 to the negative side of the power supply 41 through lead 52. The control grid 55 is also connected through resistance 57 to the positive side of the power supply through leads 48 and 47. When there is no light present on cell 36 due to the presence of the shutter 37, or a projectile 34 when hole 38 is in line with the photoelectric cell and source of light, the voltage at point 58 will be positive so that there is plate current flowing through tube 40 which will serve to energize the relay coil 49.

If light falls on the photoelectric cell 36 because of the absence of a projectile in the transfer bar, current will flow from the power lead 42 through resistance 57 and through the photoelectric cell to the negative power lead 41. In this manner, the increase of current flow through 57 will reduce the potential existent at 58 to such a point as to cause the tube to either cut off or reduce the current to such a point as to cause the relay 49 to open. Relay 49 has switch contact 59 and a switch blade 60. It is seen, therefore, that when no light falls upon 36, the relay coil 49 is energized so that blade 60 is closed on contact 59. In this manner, a circuit is completed from 61 through contact 59, blade 60, lead 62, the second relay coil 63, to the power lead 41. When the photoelectric cell 36 is not energized, 49 will be energized and 63 will be energized, thereby closing switch blade 64 on switch contact 65 which in turn closes the circuit to the motor drive. It is obvious that whether or not two switches are provided will depend upon the current to be carried and one relay may be omitted if desired. The light source 35 may be energized from leads 41 and 42.

Figure 2:
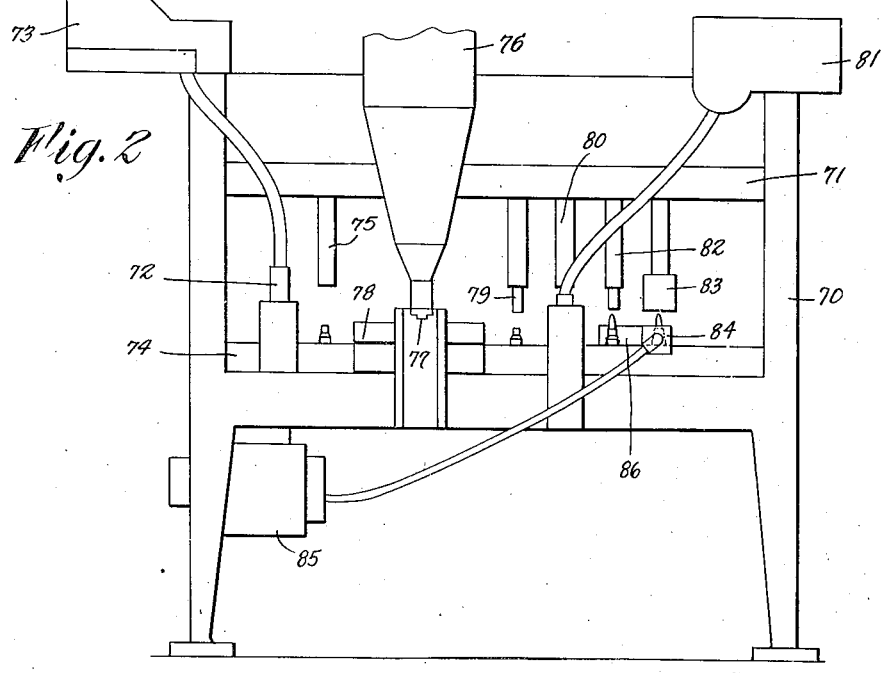
Fig. 2 shows a front diagrammatic view of a cartridge loading machine.

In Fig. 2 is illustrated another application of the present invention for use on a cartridge loading machine. The illustration is diagrammatic and comprises a frame 70 carrying reciprocating means 71 which in turn carries the various tools. By way of example, the empty cases may be furnished at 72 from hopper 73 to the reciprocating transfer means 74. Station 75 may inspect for the presence of a cartridge case and at 76 is located the powder hopper which may load powder through a suitable slide arrangement 77 into cases located on the dial 78. An inspecting station is at 79 and includes a feeler adapted to enter the case for inspection for the amount of powder therein. A projectile may be supplied at station 80 from the hopper 81 and it may be forced into the case at 82. At 83 may be located a suitable crimping means for crimping the projectile into the case. It is to be understood that these various stations and operations are merely exemplary and are not part of the present invention and that other combinations and arrangements may be used. A photoelectric cell mechanism may be located at station 84 to inspect for the presence of a projectile in the cartridge case. In the event that there is no projectile, the case, when it is removed from the machine, may spill powder with the resultant hazard. The photoelectric cell is provided to stop the machine to prevent this occurring. A main drive is located at 85 which can be connected to the photoelectric cell in a manner similar to that described for Figs. 1 and 3 to 6, inclusive. Shield 86 is located on the reciprocating transfer means which transfer means may be similar to that previously described or may be any suitable type of reciprocating transfer means for moving the cartridges from station to station in time with the reciprocation of the various punches.

In Fig. 7 will be seen a modification of the invention as applied to a bullet assembly machine, wherein 100 and 101 are the reciprocating bars of the transfer mechanism, to which are attached the pivoted fingers 102 which are similar to those previously described. The source of light 103 and photocell 104 are located on brackets 122 on the front of the machine. The photocell 104 has connections 105 to a photocell switching circuit. The light 103 has a lens to concentrate the beam of light therefrom. A mirror or reflecting surface 105 is adjustably mounted on the transfer bar 100. The mirror is so located that it will reflect light from the source of light across the projectile position 106 onto the photocell 104 when the projectile 106 is under the correction punch or other operating station. If a projectile is in place it will prevent light from reaching the photocell and, as previously described, the machine will continue operation. The mirror and beam must be of such a width that the beam will be reflected only across the projectile and be substantially limited thereto.

In Fig. 9 will be seen an application of a modification of Fig. 7 to a loading machine. In this form, the light source is at 107, the photocell at 108, and both are joined by suitable brackets to the bed 109 of the machine. A reciprocating transfer bar 110 has fingers 111 which engage the shell and move it along in its longitudinal path on the bed of the loaded machine. The reciprocating bar 110 in its return movement first moves to the right or transversely of the bed so as to clear the shell, then returns longitudinally to a position back of the preceding shell, and then moves to the left, or transversely, so as to be in position on its next forward longitudinal movement to move the shell from one station to the next station of the loading machine. The spring pressed fingers 112 are mounted on the stationary bar 113 and serve to temporarily hold the shell in position as it is moved thereagainst by the reciprocation of the transfer fingers 111. At the inspection station, the bed upon which the cartridge case 114 travels has a trap or sliding door arrangement 115 operated by a solenoid 116. A mirror 117 may be fastened and adjusted upon one of the upper transfer fingers 111 or on the bar so as to reflect the light from the light source 107 across the projectile to the photocell 108 in a manner similar to that described for Fig. 7. If a projectile is in place in case 114, the light will be prevented from reaching photocell 108 when the mirror is aligned therewith, and, by means of a suitable switching circuit, the solenoid 116 will remain unenergized. If there is no projectile in place in the cartridge case 114, light will reach photocell 108 to operate solenoid 116, thus sliding the trap door 115 to one side and allowing the case to fall into the ejection chute 118.

Another form of switching circuit which may be used is shown in Fig. 8 wherein a rectifier tube is combined within the vacuum tube.

In Fig. 10 is shown another modification where a source of light 118 directs light onto the photocell 119 which is connected to a suitable switching circuit. A switch 120 is so located that it will be closed by a cam or trigger located on the reciprocating transfer bar 121 when the ammunition component is aligned with the source of light and photocell.

The present invention provides a photoelectric cell for stopping the machine when an ammunition component is absent from the transfer bar and may be applied to various types of machines for assembling ammunition components.

The invention is not limited to the details described and illustrated but is to be construed as covering all equivalent devices falling within the scope of the appended claims.

We claim:

1. In an ammunition component assembly machine having an operating station; driving means for the machine; transfer means having component positioning means thereon for moving and positioning components to and from said station; a source of light on one side of said transfer means and a photocell on the opposite side of said transfer means; a shutter carried by said transfer means arranged to allow passage of light from the light source to the photocell only when a component positioning means is aligned with said light source, photocell and operating station; and connections between said photocell and the driving means to stop the machine in the absence of an ammunition component at the operating station.

2. In an ammunition component assembly machine having an operating station; driving means therefor; a reciprocating transfer means having component positioning means thereon for transferring components to and from said station; a source of light on one side of said transfer means and a photocell on the opposite side of said transfer means; a shutter carried by said transfer means having an aperture therein to allow passage of light from the light source to the photocell when a component positioning means is aligned with said light source, photocell and operating station, the presence of an ammunition component in the positioning means preventing light from reaching the photocell; and connections between said photocell and the driving means to stop the machine when the absence of an ammunition component at the operating station allows passage of light from the light source through the shutter and to the photocell.

3. In a bullet assembly machine having a plurality of operating stations; driving means for the machine; reciprocating transfer means having component positioning fingers thereon for progressively transferring a bullet from station to station; a reciprocating punch at one station; a source of light on one side of said transfer means and a photocell on the opposite side of said transfer means aligned with said reciprocating punch station; a shutter carried by said transfer means and located between the punch and the photocell and arranged to allow passage of light from the light source to the photocell when a bullet positioning means is aligned with said light source, photocell and reciprocating punch station; and connections between said photocell and the driving means to stop the machine in the absence of a bullet when the light source, photocell and shutter are aligned with said reciprocating punch station.

4. In a cartridge loading machine having a plurality of operating stations including bullet delivery and insertion stations; driving means for the machine; a reciprocable transfer bar having engaging means for moving the cartridge progressively from station to station and positioning the same; a source of light on one side of the transfer bar and a photocell on the opposite side of the transfer bar; a shutter carried by said transfer bar and having an aperture therein so located as to be aligned with one of said engaging means; and connections between said photocell and the driving means to stop the machine due to the absence of one of the components of the cartridge at said station.

5. In a machine having an operating station, the combination comprising; a reciprocating transfer bar with article engaging and positioning means; a source of light on one side of said transfer bar and a photocell on the opposite side of the bar aligned with said operating station; a shutter means carried by said transfer bar, said shutter having an aperture therein which is aligned with said source of light and photocell when an article has been transferred to a position at the operating station for an operation thereon; and means to stop the machine in the event there is no article present to intercept the light to the photocell from the light source when the source of light, photocell and shutter aperture are aligned.

6. In an ammunition component assembly machine having an operating station; a driving means for the machine; transfer means having component positioning means thereon for transferring components to and from said station; a source of light on one side of said transfer means and a photocell on the opposite side of said transfer means; a shutter mounted on said transfer means arranged to allow passage of light in the absence of a component when the light source, photocell, light passage and operating station are aligned; a relay for energizing said driving means; a second relay controlling the energization of said first relay; an electronic tube having a plate, cathode and control grid; a plate-cathode circuit including said plate, cathode and the second relay; a power supply; connections from one side of said power supply to said control grid including a resistance; connections from another side of the power supply to said control grid including said photocell, said second relay becoming de-energized when light falls on the photocell due to the absence of a component in the transfer means at the operating station thereby de-energizing the first relay to stop the machine.

7. In an ammunition component assembly machine having a station; driving means for the machine; transfer means having component positioning means thereon for transferring components to and from said station; a source of light; a photocell; means carried by said transfer bar to allow transmission of light from the source to the photocell when a component positioning means is aligned with said light source, photocell and station; and connections between said photocell and driving means to operate electrical means due to the absence of an ammunition component at the station allowing light to fall upon the photocell.

8. In an ammunition component assembly machine having a station; driving means having component positioning means thereon for transferring components to and from said station; a source of light; a photocell; a switch operated by said transfer means when the component positioning means, light source, station and photocell are aligned, said switch operating to render said photocell effective to stop said driving means; and connections between said photocell, switch, and driving means to operate electrical means to stop said driving means due to the absence of an ammunition component at the station allowing light to fall upon the photocell.

9. In an ammunition component assembly machine having a station; driving means for the machine; reciprocating transfer means having component positioning means thereon for transferring components to and from said station; a source of light and a photocell on the same side of said transfer means; a mirror mounted on said transfer means and reciprocating therewith for reflecting light from the light source to the photocell across the component positioning means when aligned therewith; and connections between said photocell and driving means to operate electrical means due to the absence of an ammunition component at the station allowing light to fall upon the photocell.

CHARLES B. OGILVIE.
WESLEY E. NICKELL.
LUSTER E. COLLEY.